US008863393B2

(12) United States Patent
Chen

(10) Patent No.: US 8,863,393 B2
(45) Date of Patent: Oct. 21, 2014

(54) FOLDING KNIFE WITH TWO-STAGE LOCK RELEASE

(76) Inventor: Shun-Fu Chen, New Taipei (TW)

( * ) Notice: Subject to any disclaimer, the term of this patent is extended or adjusted under 35 U.S.C. 154(b) by 847 days.

(21) Appl. No.: 13/064,833

(22) Filed: Apr. 20, 2011

(65) Prior Publication Data

US 2012/0240412 A1 Sep. 27, 2012

(30) Foreign Application Priority Data

Mar. 21, 2011 (TW) ............................. 100204978 U

(51) Int. Cl.
*B26B 1/04* (2006.01)

(52) U.S. Cl.
CPC ...................................... *B62B 1/044* (2013.01)
USPC ............................................... 30/161; 30/160

(58) Field of Classification Search
USPC ........................................... 30/155, 160, 161
See application file for complete search history.

(56) References Cited

U.S. PATENT DOCUMENTS

| | | | | |
|---|---|---|---|---|
| 5,699,615 | A * | 12/1997 | Chen | 30/160 |
| 5,875,552 | A * | 3/1999 | Chen | 30/161 |
| 6,154,965 | A * | 12/2000 | Sakai | 30/161 |
| 6,276,063 | B1 * | 8/2001 | Chen | 30/161 |
| 6,434,831 | B2 * | 8/2002 | Chen | 30/161 |
| 6,701,621 | B2 * | 3/2004 | Kain et al. | 30/160 |
| 7,437,822 | B2 * | 10/2008 | Flagg et al. | 30/161 |
| 7,854,067 | B2 * | 12/2010 | Lake | 30/159 |
| 8,375,589 | B2 * | 2/2013 | Bremer et al. | 30/155 |
| 8,499,460 | B1 * | 8/2013 | Pearman | 30/155 |
| 8,505,206 | B2 * | 8/2013 | VanHoy | 30/159 |
| 2005/0183268 | A1 * | 8/2005 | Chen | 30/161 |
| 2006/0162168 | A1 * | 7/2006 | Kao | 30/161 |
| 2007/0151110 | A1 * | 7/2007 | Chen | 30/155 |
| 2007/0169351 | A1 * | 7/2007 | Steigerwalt | 30/155 |
| 2012/0144677 | A1 * | 6/2012 | Chang | 30/161 |
| 2012/0180320 | A1 * | 7/2012 | Lo | 30/161 |
| 2012/0234142 | A1 * | 9/2012 | Onion | 81/489 |
| 2012/0240412 | A1 * | 9/2012 | Chen | 30/161 |

* cited by examiner

*Primary Examiner* — Hwei C Payer
(74) *Attorney, Agent, or Firm* — Bacon & Thomas, PLLC

(57) ABSTRACT

The present invention is to provide a folding knife with two-stage lock release, which comprises a handle including three plates, and a blade pivotally installed between first and second plates. The second plate has an elastic stop plate installed thereon having a first engage portion, such that after the blade is turned out from the handle completely, the elastic stop plate can abut against the blade. A positioning plate including a second engage portion is movably positioned between the second and third plates, and has an end extended out from the handle, such that when the blade is unfolded completely and the positioning plate is moved and fixed to a pressed position, the first and second engage portions can be engaged with each other, and the elastic stop plate can be separated from the blade, so as to enable the blade to be turned into the handle.

9 Claims, 8 Drawing Sheets

FOLDING KNIFE WITH TWO-STAGE LOCK RELEASE

FIELD OF THE INVENTION

The present invention relates to a folding knife, more particularly to a folding knife with two-stage lock release, so as to enable a user to fold a blade into a handle of the folding knife in a way of two-stage lock release and simplify the operation of the folding knife significantly.

BACKGROUND OF THE INVENTION

As the quality of our life improves in recent years, outdoor activities (such as mountain climbing) become increasingly more popular, and users usually carry a folding knife with them for the purpose of cutting or hacking objects such as tree branches and thorns in the outdoor activities. A general folding knife available in the market comprises a blade and a handle, wherein the blade is pivotally coupled to the handle and turnable into the handle or out from the handle. If a user turns the blade out from the handle in order to use the folding knife for cutting or slashing objects and the user applies an improper force or applies a force in a deviated direction, the force may be exerted onto the blade to turn the blade towards the handle automatically and cut the user's hand accidentally. Obviously, such application requires improvements.

In view of the foregoing drawback of the prior art, some manufacturers improved the conventional folding knife by installing an elastic stop plate inside the handle and attempted to fix the blade whenever the folding knife is unfolded completely. When the blade is turned and folded into the handle, the elastic stop plate elastically abuts against a side of the blade. After the user turns the blade out from the handle, an end (which is the free end) of the elastic stop plate is moved to an end (which is the end away from the tip of the knife) proximate to the blade by the elastic displacement to abut the end of the blade. Since one end of the blade is abutted by the elastic stop plate, therefore the elastic stop plate can fix the blade in a slightly stable fashion, so that the blade will not be turned and folded into the handle easily. On the other hand, after the user has finished using the folding knife and wants to fold the blade into the handle, the user needs to apply a force to the elastic stop plate first, such that an end of the elastic stop plate is moved away from the position of abutting the blade, so as to facilitate folding and storing the blade. However, if the user turns the blade out from the handle and uses the folding knife for the cutting and hacking operations, an excessive force or a bad cutting angle may shift the elastic stop plate from the position of abutting the blade by vibrations or other forces. Now, the blade may turn towards the handle suddenly or cut the user's hand. Such application is quite dangerous and may injure the users.

To overcome the aforementioned problem, some manufacturers further improved the structure of the conventional folding knife and attempted to enhance the stability of the elastic stop plate. With reference to FIG. 1 for an improved folding knife 1, the folding knife 1 comprises a blade 10, a handle 11 and a turning element 12, wherein the handle 11 includes a first plate 110, a second plate 111 and a third plate 112. A pivot 13 is passed through the third plate 112, the second plate 111, the blade 10 and the first plate 110 sequentially, such that the plates 110, 111, 112 can be combined into the handle 11, and the blade 10 can be pivotally coupled to the handle 11. The second plate 111 includes an elastic stop plate 111*a* extended from the second plate 111, and the elastic stop plate 111*a* is bent and extended in a direction towards the first plate 110. When the blade 10 is folded into the handle 11, the elastic stop plate 111*a* can abut against a side (which is the bottom side as shown in the figure) of the blade 10. The third plate 112 has a containing slot 112*a* formed thereon, and a protruding pillar 112*b* is installed onto the containing slot 112*a*. The turning element 12 is contained in the containing slot 112*a* and turnable along the pivot 13, and a turning portion 121 of the turning element 12 is extended beyond the handle 11 and provided for pressing by a user. A position restoring spring 14 is installed around the protruding pillar 112*b*, and an end of the position restoring spring 14 is abutted against a protrusion 120 of the turning element 12 to push the protrusion 120. After the blade 10 is turned completely out from the handle 11, the position restoring spring 14 pushes the protrusion 120 to a position corresponding to the elastic stop plate 111*a*, such that the protrusion 120 can press against a side (which is the bottom side) of the elastic stop plate 111*a*, and the elastic stop plate 111*a* can be fixed and abutted against an end of the blade 10 to prevent the blade 10 from folding automatically.

In the foregoing improved folding knife 1, the stability of the elastic stop plate 111*a* can be improved, but when the user wants to fold the blade 10 into the handle 11, the user has to keep pressing the turning element 12 to rotate the turning element 12 clockwise in order to resist the elastic force of the position restoring spring 14, such that after the protrusion 120 is separated from the position of abutting the elastic stop plate 111*a*, a force can be applied to the elastic stop plate 111*a* to separate from the position of abutting an end of the blade 10 to facilitate folding the blade 10. However, the complicated operation as described above is inconvenient to users. In other words, users have to press the turning element 12 and the elastic stop plate 111*a* simultaneously before the blade 10 can be turned and folded into the handle 11. When a user operates three components (which are the turning element 12, the elastic stop plate 111*a*, and the blade 10) simultaneously, the user's hand may be cut accidentally or the folding knife may be even dropped, causing damages to the blade or hurting people around. Such application is quite dangerous.

In summation, regardless of the traditional folding knife or the improved folding knife, the operation is inconvenient and the usage is relatively dangerous, and thus users cannot use the folding knife at ease. Obviously, the application is not good or safe. Therefore, it is an important subject of the present invention to overcome the shortcomings of the conventional folding knife by providing a folding knife capable of preventing the blade from folding accidentally and allowing users to fold the blade easily, so as to overcome the issues of safety and inconvenience.

SUMMARY OF THE INVENTION

In view of the aforementioned shortcomings of the conventional folding knife, the inventor of the present invention based on years of experience in the related industry to conduct extensive researches and experiments, and finally designed and developed a folding knife with two-stage lock release in accordance with the present invention, and attempted to avoid the blade from folding accidentally and effectively improve the convenience of using the folding knife, such that users can fold the blade by operating a small number of components easily, and the stability and safety of using the folding knife can be improved.

Therefore, it is a primary objective of the present invention to provide a folding knife with two-stage lock release, and the folding knife comprises a blade, a pivot, a handle and a positioning plate, wherein the handle includes a first plate, a second plate and a third plate, wherein the blade is pivotally installed between the first plate and the second plate by the pivot, and the second plate has a locking hole formed thereon and an elastic stop plate installed thereon, and the elastic stop plate has a first engage portion, such that after the blade is turned out from the handle completely, another end of the elastic stop plate can abut against an end of the blade. The positioning plate is movably positioned between the second plate and the third plate, and an end of the positioning plate is extended out from the handle, and the positioning plate includes a second engage portion and a locking portion, such that when the blade is unfolded completely and a force is exerted onto the positioning plate to move and fix the locking portion into the locking hole, the first and second engage portions can be engaged with each other, and another end of the elastic stop plate can be separated from an end of the blade, and the blade can be turned into the handle. Therefore, users need not to press the positioning plate and the elastic stop plate at the same time, but simply need to press the positioning plate only in order to fix the positioning plate, or the users simply need to press the elastic stop plate to fold the blade, so as to simplify the operation of the folding knife significantly and improve the safety of using the folding knife.

Another objective of the present invention is to provide a folding knife further comprising: a rotating plate; a first driving portion, disposed on the blade, and the rotating plate being pivotally installed between the blade and the second plate; a second driving portion, extended towards the blade, and corresponding to the first driving portion; an extended portion, disposed on the rotating plate and away from the pivot, and extended towards the first plate; a pressing portion protruded and extended towards the second plate and contained in the locking hole, such that when the blade is turned out from the handle completely, the first driving portion can push the second driving portion to turn the rotating plate to separate the pressing portion from a position of pressing an end of the locking portion, and when the blade is turned into the handle, the blade can push the extended portion to turn the rotating plate to move the pressing portion to a position of pressing an end of the locking portion in order to separate the locking portion from the locking hole. In the process of turning the blade out from the handle, the elastic stop plate can be moved to a position of pressing an end of the blade in order to separate the first engage portion from the second engage portion. Since the locking portion is pressed by the pressing portion and not entered into the locking hole, therefore the positioning plate can be pushed by a position restoring spring to move towards an end of the handle, so as to facilitate a user to press the positioning plate for folding the blade next time.

Another objective of the present invention is to provide a folding knife, wherein the first engage portion is a concave hole, and the second engage portion is a protrusion, and the second engage portion has a shape matched with the first engage portion, such that the first and second engage portion can be engaged with one another.

Another objective of the present invention is to provide a folding knife, wherein the first driving portion is an arc groove, and the second driving portion is a protruding pillar, and the second driving portion is corresponsive to the first driving portion and contained in the first driving portion, such that during the process of turning the blade out from the handle, the first driving portion can drive the second driving portion to turn the rotating plate to separate the pressing portion from the position of pressing the locking portion.

DETAILED DESCRIPTION OF THE PREFERRED EMBODIMENTS

In the process of conducting researches in the folding knife related field for a long time, the inventor of the present invention finds out that although the present folding knife has an elastic stop plate installed therein for fixing the blade when the blade is unfolded completely, yet the elastic stop plate is separated from the position of pressing the blade very often due to vibrations or other forces, thus causing the issue of cutting the users accidentally by the blade. Although some manufacturers have improved the structure of the folding knife by adding the turning element into the folding knife to abut the elastic stop plate, yet the operation of the folding knife becomes more complicated, and users have to operate three components at the same time in order to fold the blade, and such application is very inconvenient. Some manufacturers have further attempted to improve the structure of the folding knife and overcome the aforementioned problem, no feasible solution is provided yet. In view of this problem, the inventor of the present invention conducted extensive researches, and finally developed a folding knife with two-stage lock release to overcome the difficult operation of the conventional folding knife.

Figure 2:
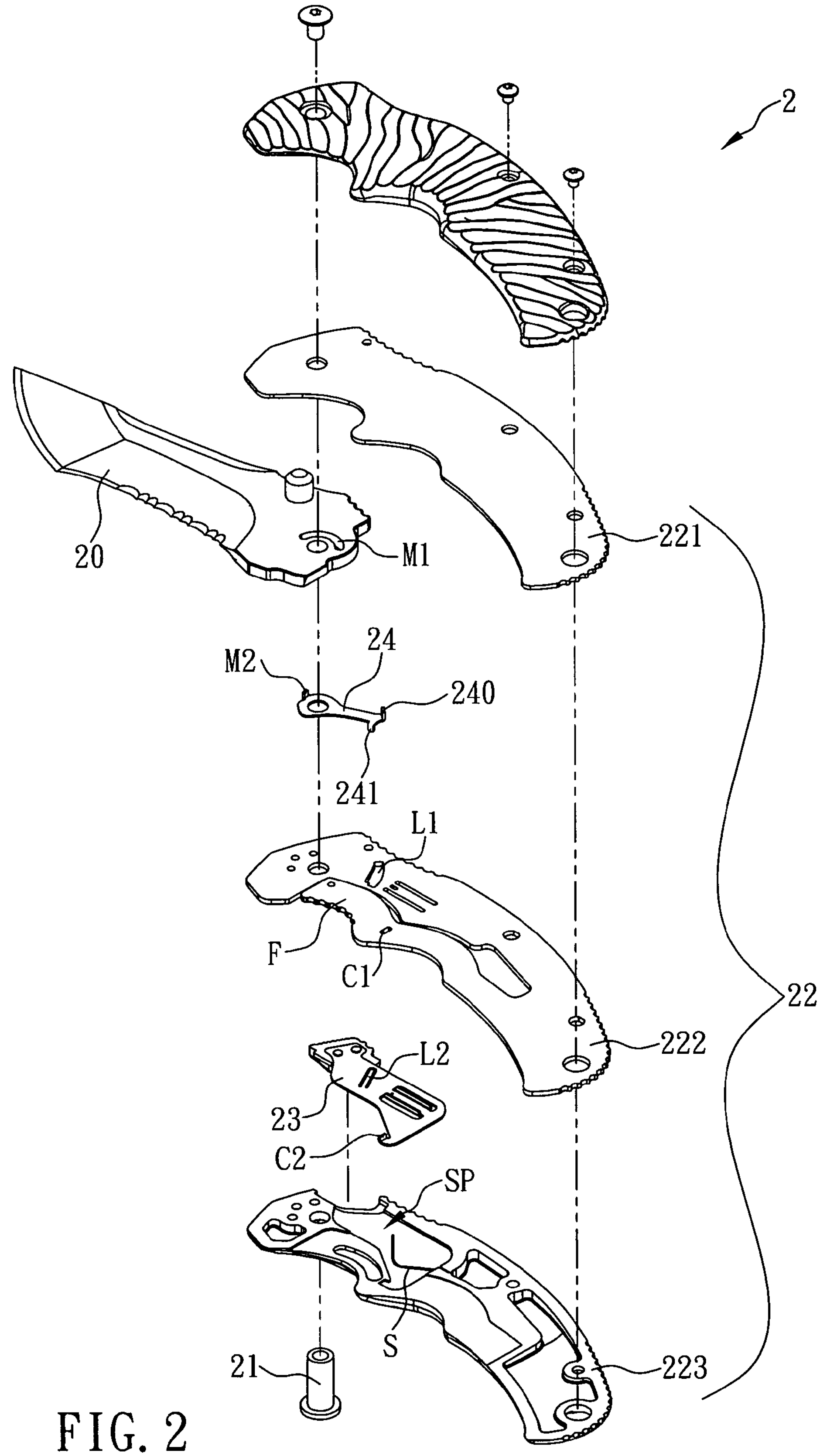
FIG. 2 is an exploded view of a preferred embodiment of the present invention.
Figure 3:
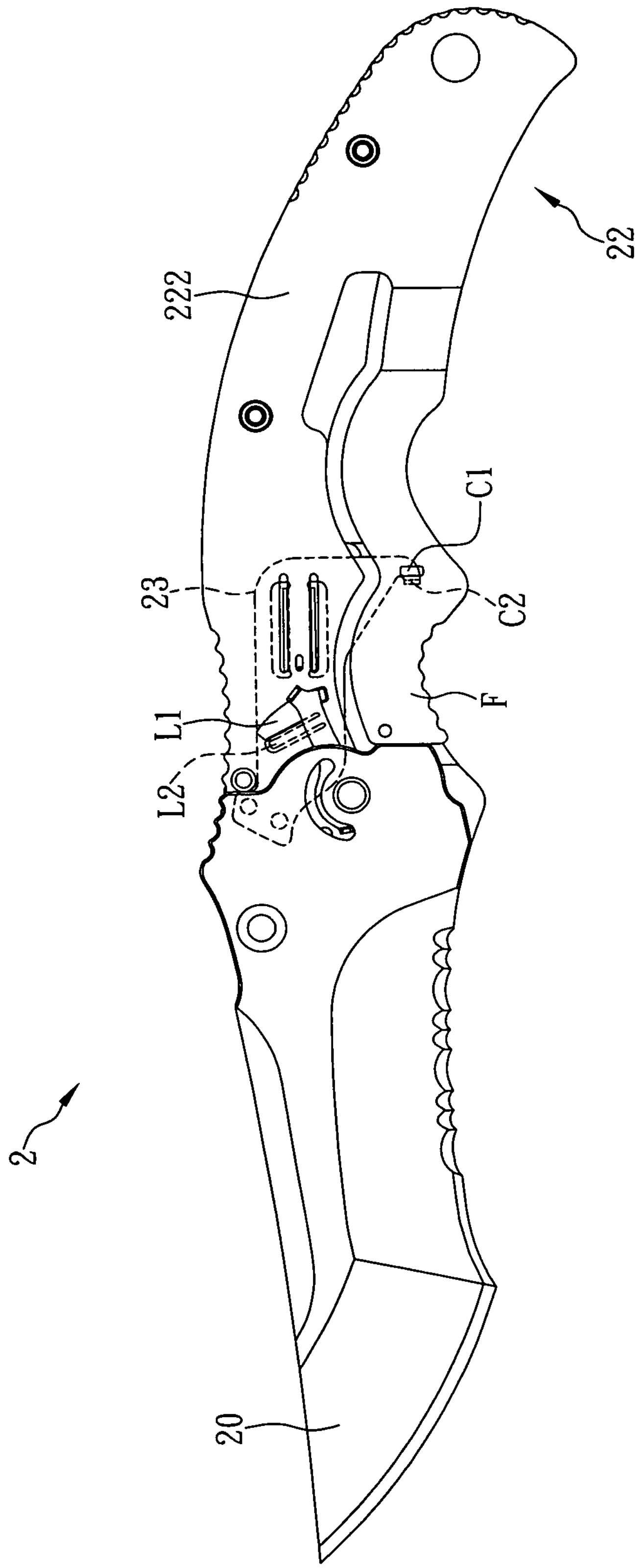
FIG. 3 is a schematic planar view of an unfolded blade of the present invention.
Figure 5:
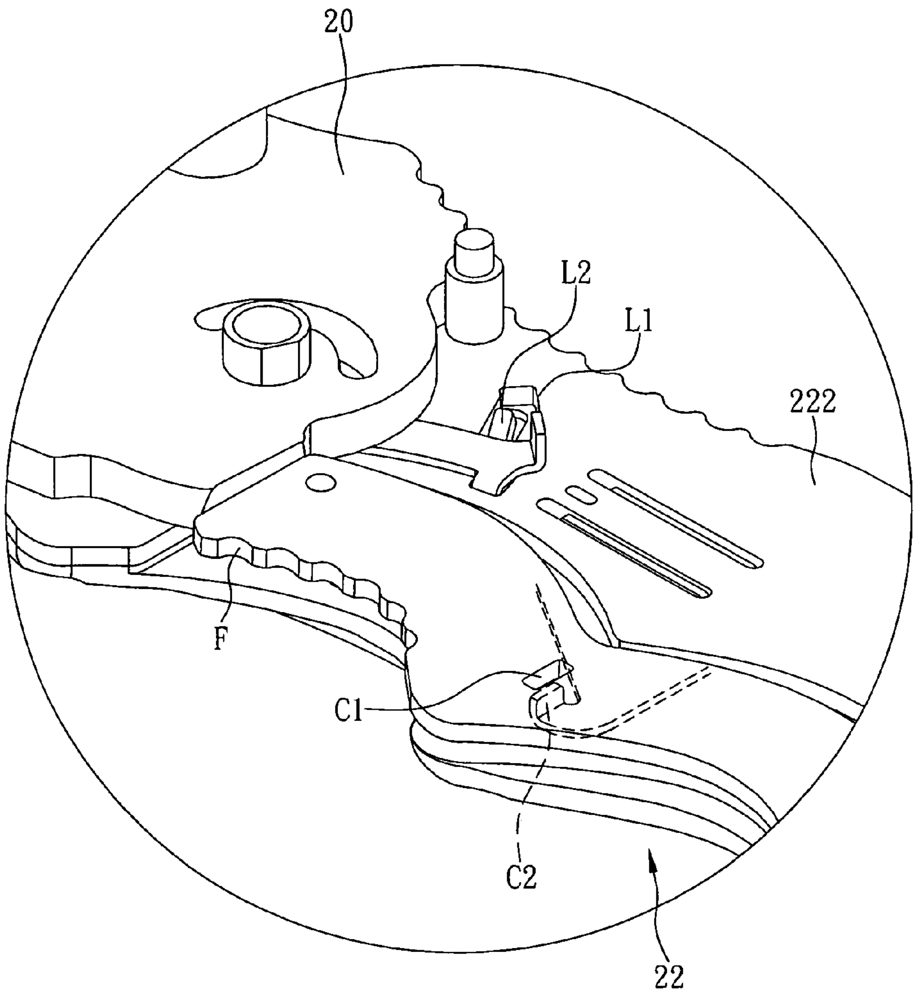
FIG. 5 is a partial schematic view of an unfolded blade of the present invention.
Figure 7:
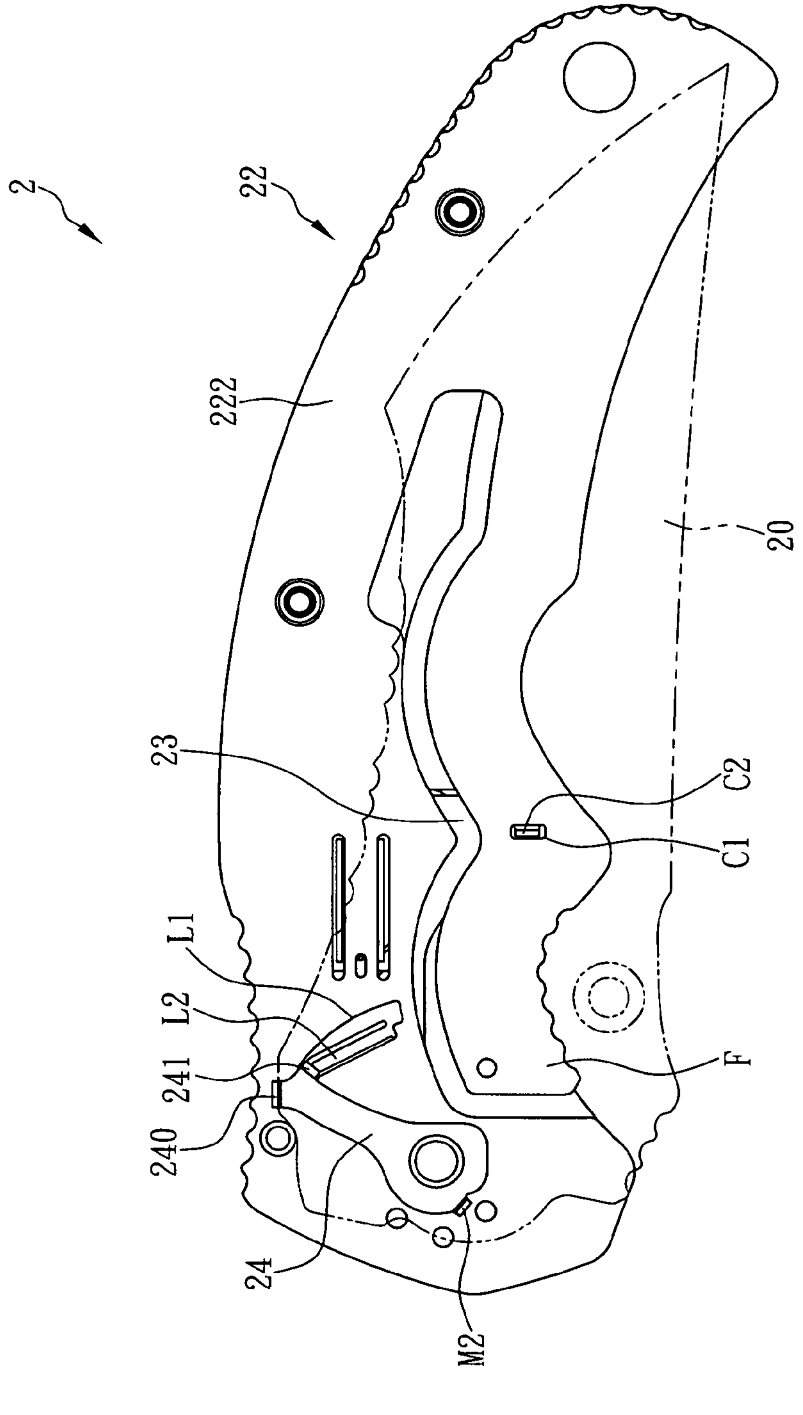
FIG. 7 is a schematic planar view of a folded blade of the present invention.

With reference to FIG. 2 for a folding knife with two-stage lock release in accordance with a preferred embodiment of the present invention, the folding knife 2 comprises a blade 20, a pivot 21, a handle 22, a positioning plate 23 and a rotating plate 24, wherein a first driving portion M1 is disposed at a position proximate to an end of the blade 20. The handle 22 includes a first plate 221, a second plate 222 and a third plate 223, and a position proximate to an end of the blade 20 is pivotally coupled to a position between the first plate 221 and the second plate 222 and proximate to an end of the handle 22 (as indicated by the left portion of FIG. 2) by the pivot 21, such that the blade 20 can be turned out from the handle 22 (as shown in FIG. 3) or turned into the handle 22 (as shown in FIG. 7) along the pivot 21. The second plate 222 has a locking hole L1 formed at a position proximate to the pivot 21, and the second plate 222 has an elastic stop plate F installed thereon, and an end of the elastic stop plate F (indicated by the lower right portion of FIG. 7) is fixed to the second plate 222, and the elastic stop plate F has a first engage portion C1 disposed thereon. Another end of the elastic stop plate F (as indicated by the left portion of the figure) is extended slantingly towards the first plate 221. With reference to FIG. 5, when the blade 20 is turned out from the handle 22 completely, another end of the elastic stop plate F can abut an end (as indicated in the right of the figure) of the blade 20 to position the blade 20 at a fully unfolded state.

In FIG. 2, a containing space SP is concavely formed on a side of the third plate 223, and the positioning plate 23 is contained in the containing space SP, and the positioning plate 23 is movably positioned between the second plate 222 and the third plate 223, and the positioning plate 23 is corresponsive to the elastic stop plate F, and an end (as indicated by the upper left portion of the figure) of the positioning plate 23 is extended beyond the handle 22, and a position restoring spring S is installed between another end (as indicated by the lower right portion of the figure) of the positioning plate 23 and the third plate 223. Of course, manufacturers can make the containing space SP on the second plate 222 and install the position restoring spring S between the other end of the positioning plate 23 and the second plate 222. The positioning plate 23 has a second engage portion C2 disposed thereon, and the second engage portion C2 has a shape matched with the first engage portion C1. In this preferred embodiment, the first engage portion C1 is a concave hole, and the second engage portion C2 is a protrusion. However, the present invention is not limited to such arrangement only, and manufacturers can design the first engage portion C1 as a bump, and the second engage portion C2 as a concave hole according to the manufacture of the folding knife 2 and the design of the present invention. The invention has been described by means of specific embodiments, numerous modifications and variations could be made thereto by those skilled in the art without departing from the scope and spirit of the invention set forth in the claims.

Figure 4:
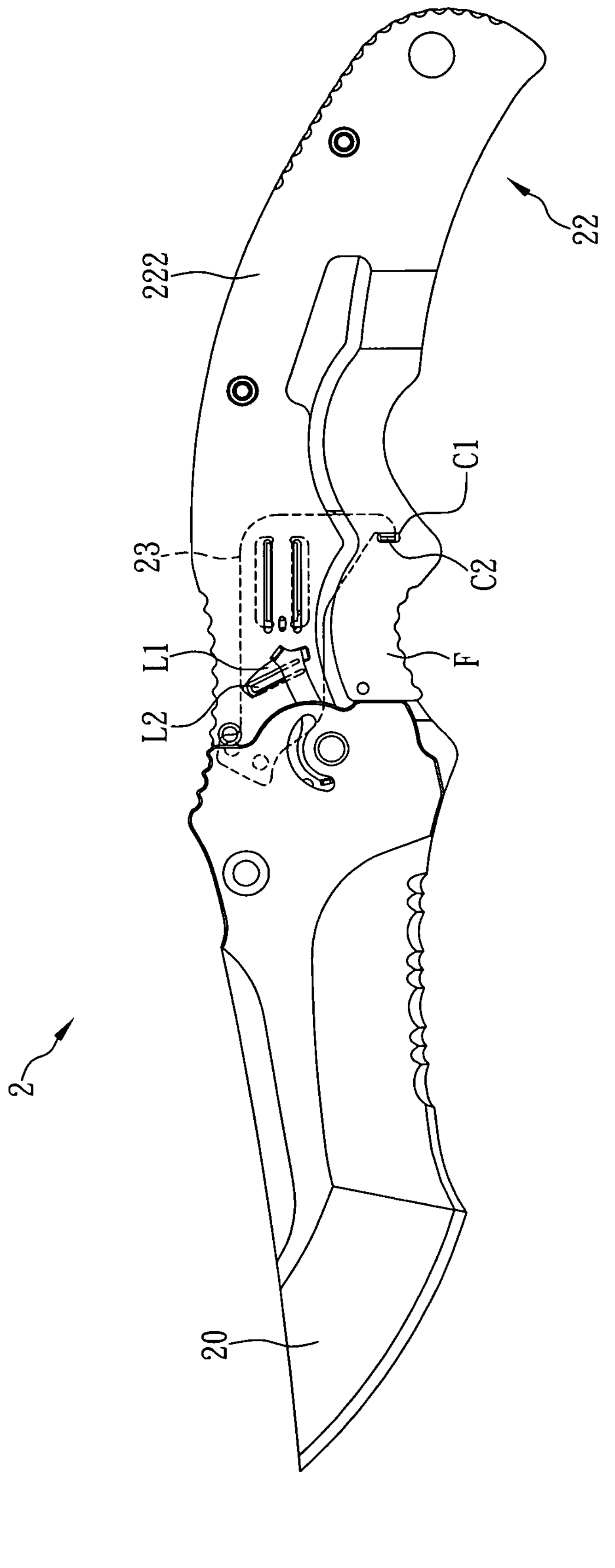
FIG. 4 is another schematic planar view of an unfolded blade of the present invention.
Figure 6:
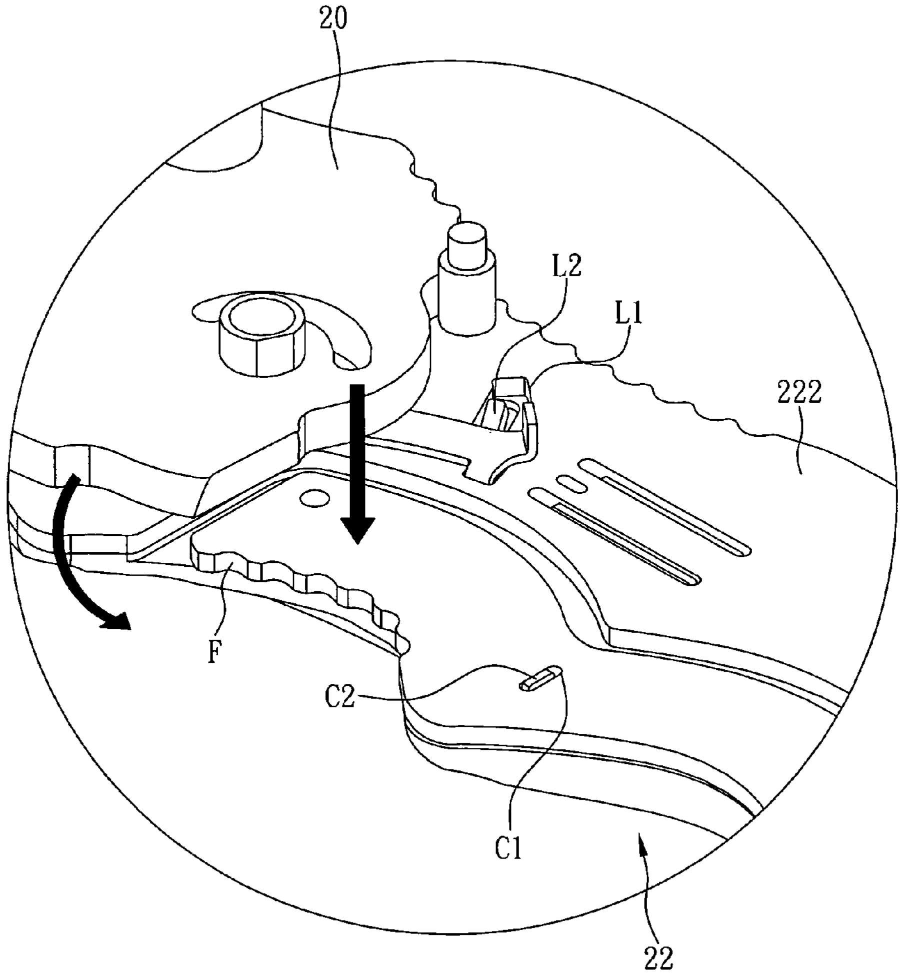
FIG. 6 is another partial schematic view of an unfolded blade of the present invention.

In addition, the positioning plate 23 includes a locking portion L2 with an end (as indicated by the upper right portion of the figure) extended towards the second plate 222. In the conditions when the blade 20 is unfolded completely and the positioning plate 23 is not shifted, an end of the locking portion L2 is abutted against the second plate 222 and at a position proximate to the locking hole L1 and not entered into the locking hole L1 as shown in FIG. 3. Now, the second engage portion C2 is not aligned with the first engage portion C1 precisely, so that the user cannot turn the elastic stop plate F. In other words, another end (as indicated by the left of the figure) of the elastic stop plate F abuts against the blade 20. Similarly, when the blade 20 is unfolded completely as shown in FIG. 4, and the positioning plate 23 is shifted (to the right) by a force to compress the position restoring spring S (as shown in FIG. 2) such that the locking portion L2 is shifted to a position corresponding to the locking hole L1, the second engage portion C2 is also shifted to a position corresponding to the first engage portion C1. Now, the locking portion L2 is extended and positioned into the locking hole L1, and the positioning plate 23 is situated at the first release state, and the positioning plate 23 is fixed, and thus the second engage portion C2 of the positioning plate 23 can be aligned with the first engage portion C1 precisely. With reference to FIGS. 5 and 6, users can apply a force to the elastic stop plate F, such that the first and second engage portions C1, C2 can be engaged with each other, while another end (as indicated by the left of the figure) of the elastic stop plate F is separated from an end of the blade 20 by a force, and thus the blade 20 is situated at a second release state to turn the blade 20 into the handle 22.

In FIG. 4, the forgoing technical characteristic is adopted, such that when a user folds the blade 20, the user needs not to press the positioning plate 23 and the elastic stop plate F simultaneously, and the user simply needs to press the positioning plate 23 to set the positioning plate 23 to the first release state, such that the positioning plate 23 can be positioned to the pressed state automatically by the embodiment of the locking portion L2 in the locking hole L1, and the user just needs to press the elastic stop plate F to set the blade 20 to a second release state (as shown in FIG. 6) in order to fold the blade 20 into the handle 22 completely. In other words, after the user has pressed the positioning plate 23, the user no longer needs to touch the positioning plate 23. Compared with the process of folding the conventional folding knife (that requires an operation of three components at the same time), the user just needs to operate two components (which are the elastic stop plate F and the blade 20) in order to fold the blade 20. The invention not only simplifies the operation of the folding knife significantly, but also prevents the blade 20 from cutting the user accidentally during the process of folding the blade 20 and effectively improves the safety of using the folding knife 2.

In FIG. 2, in addition to the foregoing technical character, the rotating plate 24 is pivotally installed between the blade 20 and the second plate 222 by the pivot 21, and the rotating plate 24 has a second driving portion M2 disposed at a position proximate to the pivot 21 and extended towards the blade 20, and the second driving portion M2 is corresponsive to the first driving portion M1. In this preferred embodiment, the first driving portion M1 is an arc groove penetrating through the blade 20, and the second driving portion M2 is a protruding pillar, and the second driving portion M2 is extended into the first driving portion M1. However, the present invention is not limited to such arrangement only, but manufacturers can change the structure according to the first driving portion M1 for the manufacture of the blade 20 of the present invention and can design the first driving portion M1 as an arc groove not penetrating through the blade 20 and extend the second driving portion M2 into the first driving portion M1 to achieve the same effect of the invention. The rotating plate 24 has an extended portion 240 disposed at a position away from the pivot 21 and extended towards the first plate 221, and a pressing portion 241 protruded and extended towards the second plate 222, and the pressing portion 241 is contained into the locking hole L1. With reference to FIG. 7, when the blade 20 is turned into the handle 22, the blade 20 can push the extended portion 240 to turn the rotating plate 24 in order to move the pressing portion 241 to a position of pressing an end of the locking portion L2 to separate the locking portion L2 from the locking hole L1. Since the first and second engage portions C1, C2 can maintain engaging with each other, therefore the positioning plate 23 can maintain the state after its being pressed.

Figure 8:
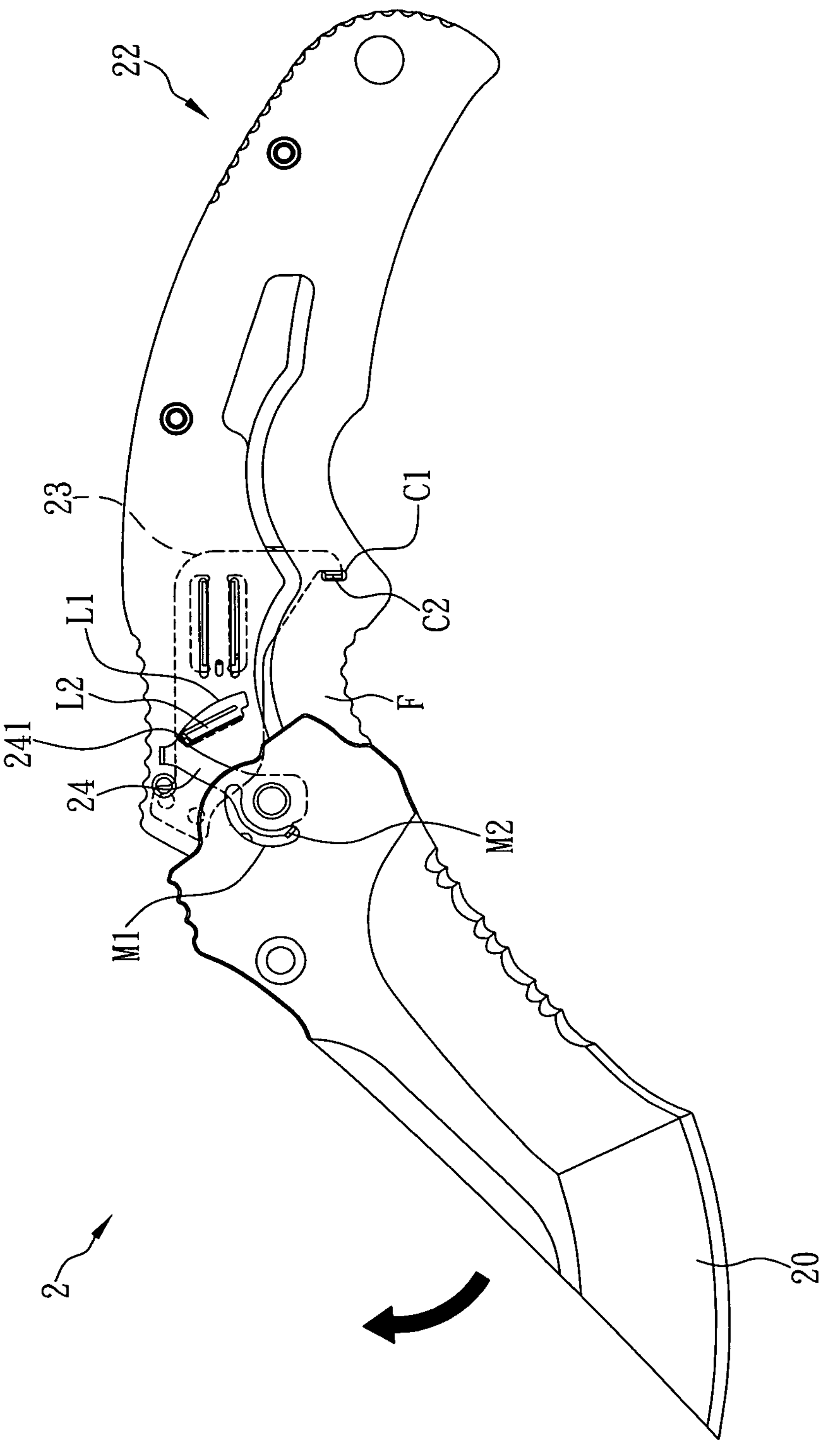
FIG. 8 is a schematic planar view of a process of unfolding a blade of the present invention.

With reference to FIG. 8 for a process of turning the blade 20 out from the handle 22, the first driving portion M1 pushes the second driving portion M2 to turn the rotating plate 24. When the blade 20 is turned out from the handle 22 completely, the elastic stop plate F is moved to a position of abutting an end of the blade 20 immediately (as shown in FIG. 3), such that the first engage portion C1 is separated from the second engage portion C2. Now, the first engage portion C1 and the second engage portion C2 are separated from each other, and the locking portion L2 is still pressed and not entered into the locking hole L1, so that the positioning plate 23 is no longer restricted by the first and second engage portions C1, C2 or restricted by the locking hole L1 anymore, and the positioning plate 23 can be moved by the position restoring spring S in a direction towards an end of the handle 22 (as indicated by the left of the figure) to define a status as shown in FIG. 3. In this status, an end of the blade 20 is abutted by the elastic stop plate F, and a side of the elastic stop plate F is also supported and abutted by the second engage portion C2, so that the blade 20 can maintain its unfolded state stably. The present invention not only effectively prevents the blade 20 from being unfolded accidentally, but also prevents the blade 20 from cutting users or other people accidentally.

In summation of the description above, the present invention is characterized in that when the blade 20 is unfolded completely, the elastic stop plate F presses against an end of the blade 20, and the second engage portion C2 supports and abuts the elastic stop plate F, so that the elastic stop plate F can still abut an end of the blade 20 securely even if a user applies a force at an improper angle or applies an excessive force during the use of the folding knife 2, so as to effectively prevent the blade 20 from separating from the position of abutting the elastic stop plate F and prevent the blade 20 from cutting the user accidentally. In addition, if the user wants to fold the blade 20, the user simply needs to press the positioning plate 23 once to set the positioning plate 23 to the first release state, and press the elastic stop plate F, such that the elastic stop plate F no longer abuts an end of the blade 20, and the blade 20 can be folded. Compared with the conventional folding knife, the user simply needs to operate the elastic stop plate F and the blade 20 at the same time to fold the blade 20, and thus the present invention can simplify the procedure of operating the blade 20 significantly to improve the convenience and safety of using the folding knife 2.

Figure 1:
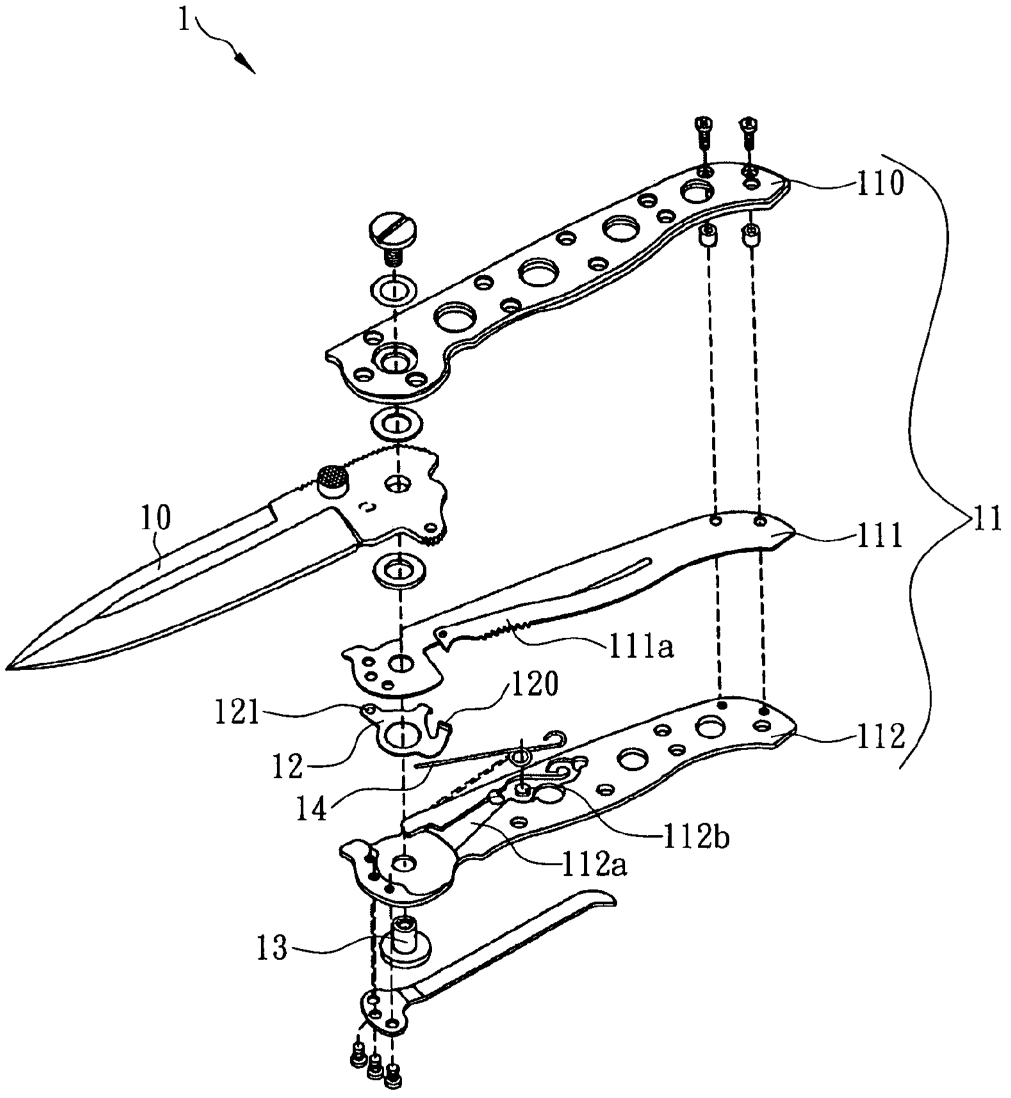
FIG. 1 (Prior Art)
FIG. 1 is an exploded view of a conventional folding knife.

Besides the foregoing preferred embodiment, manufacturers can reference the structure of the conventional turning element 12 (as shown in FIG. 1) to design the positioning plate of the present invention, such that the positioning plate can be pivotally mounted onto the pivot 21 and movably positioned between the second plate 222 and the third plate 223. When a user turns the positioning plate, the second engage portion (or the protrusion) of the positioning plate is separated from the state of latching the elastic stop plate F, so that the elastic stop plate F can be separated from an end of the blade 20 by a force.

While the invention has been described by means of specific embodiments, numerous modifications and variations could be made thereto by those skilled in the art without departing from the scope of the invention set forth in the claims.

What is claimed is:

1. A folding knife with two-stage lock release, comprising:

a blade;

a pivot;

a handle including a first plate, a second plate and a third plate, wherein a position proximate to an end of the blade is pivotally coupled to a position between the first plate and the second plate and proximate to an end of the handle by the pivot, the second plate has a locking hole formed on the second plate and an elastic stop plate installed thereon, a first end of the elastic stop plate is fixed to the second plate, and a second end of the elastic stop plate is extended slantingly towards the first plate; such that, when the blade is turned out from the handle completely, the second end of the elastic stop plate abuts the end of the blade; and a positioning plate movably positioned between the second plate and the third plate, and corresponding to the elastic stop plate, wherein a first end of the positioning plate is extended out of the handle, a position restoring spring is installed between a second end of the positioning plate and the second plate or the third plate, the positioning plate has a locking portion disposed thereon, and an end of the locking portion is extended towards the second plate; such that, when the blade is unfolded completely and a force is applied to move the positioning plate and compress the position restoring spring, the locking portion is moved to a position corresponding to the locking hole and extended into the locking hole to set the positioning plate to a first-stage release state in order to separate a protrusion of the positioning plate from a latch with the elastic stop plate, and the elastic stop plate is then separated from the end of the blade by a force to set the blade to a second-stage release state in order to turn and fold the blade into the handle.

2. The folding knife of claim 1, wherein the positioning plate is pivotally installed on the pivot and movably positioned between the second plate and the third plate.

3. The folding knife of claim 1, wherein the elastic stop plate has a first engage portion, the protrusion of the positioning plate is a second engage portion, the second engage portion has a shape matched with the first engage portion; such that, when the blade is unfolded completely, the second engage portion of the positioning plate and the first engage portion of the elastic stop plate are engaged with each other, and the elastic stop plate is separated from the end of the blade by a force to set the blade at a second-stage release stage in order to turn and fold the blade into the handle.

4. The folding knife of claim 2, further comprising a rotating plate and a first driving portion disposed proximate to the end of the blade, wherein the rotating plate is pivotally installed between the blade and the second plate by the pivot, a second driving portion is disposed on the rotating plate and extended towards the blade corresponding to the first driving portion, an extended portion is protruded from the rotating plate and extended towards the first plate, and a pressing portion is protruded and extended towards the second plate and contained in the locking hole; such that, when the blade is turned into the handle, the blade is pushed by the extended portion to turn the rotating plate, and the pressing portion is moved to a position of pressing an end of the locking portion to separate the locking portion from the locking hole.

5. The folding knife of claim 3, further comprising a rotating plate and a first driving portion disposed proximate to the end of the blade, wherein the rotating plate is pivotally installed between the blade and the second plate by the pivot, a second driving portion is disposed on the rotating plate and extended towards the blade corresponding to the first driving portion, an extended portion is protruded from the rotating plate and extended towards the first plate, and a pressing portion is protruded and extended towards the second plate and contained in the locking hole; such that, when the blade is turned into the handle, the blade is pushed by the extended portion to turn the rotating plate, and the pressing portion is moved to a position of pressing an end of the locking portion to separate the locking portion from the locking hole.

6. The folding knife of claim 4, wherein the third plate includes a containing space concavely formed on a side of the third plate, and the positioning plate is contained in the containing space.

7. The folding knife of claim 5, wherein the third plate includes a containing space concavely formed on a side of the third plate, and the positioning plate is contained in the containing space.

8. The folding knife of claim 6, wherein the first driving portion is an arc groove, and the second driving portion is a protruding pillar.

9. The folding knife of claim 7, wherein the first driving portion is an arc groove, and the second driving portion is a protruding pillar.

* * * * *